(12) United States Patent
Larmuseau et al.

(10) Patent No.: US 11,661,309 B2
(45) Date of Patent: May 30, 2023

(54) SMART GUIDANCE FOR CONTROLLING PASSENGER TO ENTER CORRECT ELEVATOR CAR

(71) Applicant: Otis Elevator Company, Farmington, CT (US)

(72) Inventors: Adriaan Joris H. Larmuseau, Shanghai (CN); Changle Li, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 543 days.

(21) Appl. No.: 16/626,473

(22) PCT Filed: Jul. 19, 2018

(86) PCT No.: PCT/CN2018/096253
§ 371 (c)(1),
(2) Date: Dec. 24, 2019

(87) PCT Pub. No.: WO2019/015642
PCT Pub. Date: Jan. 24, 2019

(65) Prior Publication Data
US 2020/0239277 A1 Jul. 30, 2020

(30) Foreign Application Priority Data
Jul. 19, 2017 (CN) .......................... 201710589473.3

(51) Int. Cl.
*B66B 1/16* (2006.01)
*B66B 3/00* (2006.01)
(Continued)

(52) U.S. Cl.
CPC .............. *B66B 3/006* (2013.01); *B66B 1/468* (2013.01); *G06F 3/016* (2013.01); *G06F 3/167* (2013.01);
(Continued)

(58) Field of Classification Search
CPC . B66B 3/006; B66B 1/468; B66B 2201/4653; B66B 1/3461; B66B 3/00;
(Continued)

(56) References Cited

U.S. PATENT DOCUMENTS 6,109,396 A * 8/2000 Sirag ....................... B66B 1/468
187/392
7,539,576 B2 5/2009 Ohnishi et al.
(Continued)

FOREIGN PATENT DOCUMENTS

CN 101035731 A1 9/2007
CN 103183262 B 7/2013
(Continued)

OTHER PUBLICATIONS

International Search Report and Written Opinion for application PCT/CN2018/096253, dated Sep. 29, 2018, 13 pages.
(Continued)

*Primary Examiner* — Erika A Washington
(74) *Attorney, Agent, or Firm* — Cantor Colburn LLP (57) ABSTRACT

The present invention relates to the guidance for a passenger to enter a correct elevator car, belonging to the field of elevator intelligent control technologies. In a method for guiding a passenger to enter a correct elevator car provided in the present invention, the movement of the passenger relative to one of a plurality of elevator cars is determined based on a change in the signal strength of a received first wireless signal; and whether the movement is a movement corresponding to entering a correct elevator car is judged based on a recognition result. The present invention can realize that a passenger is automatically guided to enter a correct elevator car by means of the change in a vibration signal and/or a voice prompt signal.

20 Claims, 4 Drawing Sheets

(51) Int. Cl.
*H04B 17/318* (2015.01)
*H04W 4/024* (2018.01)
*H04W 4/33* (2018.01)
*H04W 4/80* (2018.01)
*B66B 1/46* (2006.01)
*G06F 3/01* (2006.01)
*G06F 3/16* (2006.01)

(52) U.S. Cl.
CPC .......... *H04B 17/318* (2015.01); *H04W 4/024* (2018.02); *H04W 4/33* (2018.02); *H04W 4/80* (2018.02); *B66B 2201/4653* (2013.01)

(58) Field of Classification Search
CPC ....... G06F 3/016; G06F 3/167; H04B 17/318; H04W 4/024; H04W 4/33; H04W 4/80
See application file for complete search history.

(56) References Cited

U.S. PATENT DOCUMENTS

| | | | |
|---|---|---|---|
| 8,040,224 | B2 | 10/2011 | Hwang |
| 8,077,019 | B2 | 12/2011 | Hofmann et al. |
| 8,466,778 | B2 | 6/2013 | Hwang et al. |
| 8,552,859 | B2 | 10/2013 | Pakula et al. |
| 8,710,966 | B2 | 4/2014 | Hill |
| 9,008,859 | B2 | 4/2015 | Herzog et al. |
| 9,120,009 | B2 | 9/2015 | Bae et al. |
| 9,561,932 | B2 * | 2/2017 | Salmikuukka .......... B66B 3/006 |
| 2002/0063632 | A1 | 5/2002 | Bowman et al. |
| 2007/0045051 | A1 * | 3/2007 | Gerstenkorn .......... B66B 1/468 187/380 |
| 2010/0109918 | A1 | 5/2010 | Liebermann |
| 2014/0122018 | A1 | 5/2014 | Sundholm et al. |
| 2015/0141043 | A1 | 5/2015 | Abramson |
| 2015/0314984 | A1 | 11/2015 | McCarthy |
| 2015/0368067 | A1 | 12/2015 | Tang et al. |
| 2016/0122157 | A1 | 5/2016 | Keser |
| 2016/0221791 | A1 * | 8/2016 | Berryhill ............... B66B 1/2458 |
| 2016/0277560 | A1 | 9/2016 | Gruberman et al. |

FOREIGN PATENT DOCUMENTS

| | | | |
|---|---|---|---|
| CN | 104276462 A * | 1/2015 | ............... B66B 1/14 |
| CN | 204980676 U | 1/2016 | |
| CN | 105502111 A | 4/2016 | |
| CN | 106586733 A | 4/2017 | |
| EP | 3116200 A2 | 1/2017 | |
| JP | 2003192244 A | 7/2003 | |
| WO | 09132696 A1 | 11/2009 | |
| WO | 2015082717 A1 | 6/2015 | |

OTHER PUBLICATIONS

European Search Report for Application No. 18834858.5; dated Jun. 24, 2021; 9 Pages.

* cited by examiner

SMART GUIDANCE FOR CONTROLLING PASSENGER TO ENTER CORRECT ELEVATOR CAR

TECHNICAL FIELD

The present invention belongs to the field of elevator intelligent control technologies, relating to guiding the movement of a passenger relative to an elevator car by utilizing the communication and interaction between a wireless signal broadcast component mounted in the elevator car and a personal mobile terminal.

BACKGROUND ART

As the complexity of the structure of constructions or buildings increases, an elevator system mounted therein for delivering passengers generally has a plurality of elevator cars.

After a passenger performs an elevator calling operation, the elevator system will carry out scheduling arrangement based on the elevator calling operation, wherein one approach commonly seen is to designate for the passenger a certain elevator car from a plurality of running elevator cars as a correct elevator car.

However, there exists such a situation where the passenger may easily enter an incorrect elevator car when a plurality of elevator cars approximately simultaneously stop at the landing where the passenger is located.

SUMMARY OF THE INVENT N

According to a first aspect of the present invention, provided is an apparatus for guiding a passenger to enter a correct elevator car, comprising: a first wireless signal broadcast component mounted in a plurality of elevator cars for broadcasting a recognizable first wireless signal, wherein the signal strength of the first wireless signal approximately decreases with the increase of a broadcast distance thereof, and wherein, via a personal mobile terminal carried by the passenger, the apparatus receives and recognizes the first wireless signal broadcast by the first wireless signal broadcast component of at least one of the plurality of elevator cars and determines the signal strength of the received first wireless signal, and wherein, via the personal mobile terminal, the apparatus also determines the movement of the passenger relative to one of a plurality of elevator cars based on the change in the signal strength of the received first wireless signal and further judges, based on the recognition result, whether the movement is a movement corresponding to entering the correct elevator car.

The apparatus according to one embodiment of the present invention, wherein, via the personal mobile terminal, the apparatus also generates the change in a corresponding vibration signal and/or a corresponding voice prompt signal based on the judgement result and guides the passenger to enter the correct elevator car.

The apparatus according to one embodiment of the present invention, wherein, via the personal mobile terminal, the apparatus also enhances the vibration signal and/or sends out a voice prompt signal when the movement is not a movement corresponding to entering the correct elevator car.

The apparatus according to one embodiment of the present invention, wherein the first wireless signal comprises identity information corresponding to the elevator car mounted with the first wireless signal broadcast component; and via the personal mobile terminal, the apparatus also recognizes the identity information of the first wireless signal and judges, based on the recognized identity information, whether the movement is a movement corresponding to the correct elevator car.

The apparatus according to one embodiment of the present invention, wherein the correct elevator car is temporarily stored in the personal mobile terminal.

The apparatus according to one embodiment of the present invention, wherein the first wireless signal broadcast component is a bluetooth lower energy module, and the first wireless signal is a bluetooth lower energy signal.

The apparatus according to one embodiment of the present invention, comprising a second wireless signal broadcast component mounted in an elevator landing area for sending information about the correct elevator car to the personal mobile terminal.

According to a second aspect of the present invention, provided is an elevator system, comprising a plurality of elevator cars and an elevator controller, and further comprising: the apparatus for guiding the passenger to enter a correct elevator car provided in the first aspect of the present invention.

The elevator system according to one embodiment of the present invention, wherein the elevator system further comprises a second wireless signal broadcast component mounted in an elevator landing area, and the second wireless signal broadcast component is configured to: broadcast a second wireless signal, and automatically establish a wireless communication connection with the personal mobile terminal based on the second wireless signal, and receive an elevator calling request command sent automatically from the personal mobile terminal when establishing the wireless communication connection.

The elevator system according to one embodiment of the present invention, wherein the personal mobile terminal is further configured to: approximately determine a distance from the personal mobile terminal to the second wireless signal broadcast component according to the signal strength of the second wireless signal, and automatically establish the wireless communication connection when the distance is smaller than or equal to a pre-determined distance threshold.

The elevator system according to one embodiment of the present invention, wherein the second wireless signal broadcast component is used for sending the elevator calling request command to the elevator controller, and wherein the elevator controller is used for designating a corresponding elevator car for the passenger based on the elevator calling request command, and the elevator system is used for sending, through the second wireless signal broadcast component, information about the designated elevator car to the personal mobile terminal.

According to a third aspect of the present invention, provided is a method for guiding a passenger to enter a correct elevator car, comprising steps of:

receiving a recognizable first wireless signal, wherein the first wireless signal is broadcast from at least one of a plurality of elevator cars, and the signal strength of the first wireless signal approximately decreases with the increase of a broadcast distance thereof;

recognizing the received first wireless signal so as to determine which one of the plurality of elevator cars the first wireless signal is broadcast from;

determining the movement of the passenger relative to one of the plurality of elevator cars based on the change in the signal strength of the received first wireless signal; and judging, based on the recognition result, whether the movement is a movement corresponding to entering the correct elevator car.

The method according to one embodiment of the present invention, wherein the method further comprises a step of:

based on the judgement result, guiding the passenger to enter the correct elevator car by means of the change in a vibration signal and/or a voice prompt signal.

The method according to one embodiment of the present invention, wherein in the step of guiding the passenger to enter the correct elevator car, when the movement is a movement corresponding to entering the correct elevator car, no vibration signal is sent out or the vibration signal is weakened; and when the movement is not a movement corresponding to entering the correct elevator car, the vibration signal is enhanced and/or a voice prompt signal is sent out.

The method according to one embodiment of the present invention, wherein the first wireless signal comprises identity information corresponding to the elevator car mounted with the first wireless signal broadcast component; and in the recognition step, identity information in the first wireless signal is recognized.

The method according to one embodiment of the present invention, wherein in the judgement step, the identity information is compared with identity information corresponding to the correct elevator car, and if they are the same, it is determined that the movement is a movement corresponding to the correct elevator car.

The method according to one embodiment of the present invention, wherein in the movement determination step, if the signal strength of the received first wireless signal gradually increases, it is determined that the movement of the passenger is approaching an elevator car corresponding to the first wireless signal, and if the signal strength of the received first wireless signal gradually decreases, it is determined that the movement of the passenger is going away from the elevator car corresponding to the first wireless signal.

The method according to one embodiment of the present invention, wherein the first wireless signal is a bluetooth lower energy signal.

According to a fourth aspect of the present invention, provided is a computer apparatus comprising a memory, a processor and a computer program stored on the memory and operable on the processor, wherein when the program is executed by the processor, steps of any of the above described methods are implemented.

According to a fifth aspect of the present invention, provided is a personal mobile terminal, comprising:

a wireless communication module for at least receiving a recognizable first wireless signal, wherein the first wireless signal is broadcast from at least one of a plurality of elevator cars, and the signal strength of the first wireless signal approximately decreases with the increase of a broadcast distance thereof;

a signal recognition module for recognizing the received first wireless signal so as to determine which one of the plurality of elevator cars the first wireless signal is broadcast from;

a movement determination module for determining the movement of the passenger relative to one of the plurality of elevator cars based on the change in the signal strength of the received first wireless signal; and a judgement module for judging, based on a recognition result, whether the movement is a movement corresponding to entering the correct elevator car.

According to a sixth aspect of the present invention, provided is a computer readable storage medium with a computer program stored thereon, wherein the program is executable by a processor to implement the steps of any method mentioned above.

According to a seventh aspect of the present invention, provided is a system for guiding a passenger to enter a correct elevator car, capable of operating in a personal mobile terminal. The system comprises:

a wireless communication module for at least receiving a recognizable first wireless signal, wherein the first wireless signal is broadcast from at least one of a plurality of elevator cars, and the signal strength of the first wireless signal approximately decreases with the increase of a broadcast distance thereof;

a signal recognition module for recognizing the received first wireless signal so as to determine which one of the plurality of elevator cars the first wireless signal is broadcast from;

a movement determination module for determining the movement of the passenger relative to one of the plurality of elevator cars based on the change in the signal strength of the received first wireless signal; and a judgement module for judging, based on the recognition result, whether the movement is a movement corresponding to entering the correct elevator car.

The system according to one embodiment of the present invention, further comprising:

a guidance module for, based on the judgement result, guiding the passenger to enter the correct elevator car by means of the change in a vibration signal and/or a voice prompt signal.

The system according to one embodiment of the present invention, wherein the guidance module is further used for: sending out no vibration signal or weakening the vibration signal when the movement is a movement corresponding to entering the correct elevator car, and enhancing the vibration signal and/or sending out a voice prompt signal when the movement is not a movement corresponding to entering the correct elevator car.

The system according to one embodiment of the present invention, wherein the first wireless signal comprises identity information corresponding to the elevator car mounted with the first wireless signal broadcast component; and the signal recognition module is used for recognizing identity information in the first wireless signal.

The system according to one embodiment of the present invention, wherein the judgement module is further used for: comparing the identity information to identity information corresponding to the correct elevator car, and if they are the same, determining that the movement is a movement corresponding to the correct elevator car.

The system according to one embodiment of the present invention, wherein the movement determination module is further used for: if the signal strength of the received first wireless signal gradually increases, determining that the movement of the passenger is approaching an elevator car corresponding to the first wireless signal, and if the signal strength of the received first wireless signal gradually decreases, determining that the movement of the passenger is going away from the elevator car corresponding to the first wireless signal.

The system according to one embodiment of the present invention, wherein the correct elevator car is temporarily stored in the personal mobile terminal.

The above-mentioned features and operations of the present invention would be more obvious according to the description below and the accompanying drawings.

DESCRIPTION OF THE DRAWINGS

From the detailed description below in conjunction with the accompanying drawings, the above-mentioned and other objects and advantages of the present invention would be more complete and clearer, where the same or similar elements are denoted with the same label.

DETAILED DESCRIPTION

The present invention will now be described more thoroughly with reference to the drawings, in which illustrative embodiments of the present invention are shown. However, the present invention can be implemented in many different ways and should not be construed as being limited to the embodiments illustrated herein. On the contrary, these embodiments are provided to make the present disclosure more thorough and complete, and fully convey the ideas of the present invention to a person skilled in the art.

Some block diagrams shown in the accompany drawings are functional entities, and not necessarily corresponding to entities which are independent physically or logically. It is possible to realize these functional entities by way of software, or to realize these functional entities in one or more hardware modules or integrated circuits, or to realize these functional entities in different processing apparatuses and/or micro-controller apparatuses.

In the present specification, for the convenience of description, an "apparatus for guiding a passenger to enter a correct elevator car" is abbreviated as a "guidance apparatus", and a "method for guiding a passenger to enter a correct elevator car" is abbreviated as a "guidance method".

In the present specification, a "correct elevator car" refers to an elevator car capable of delivering a passenger to a target floor, and particularly can be for example an elevator car designated for the passenger. It will be understood that a correct elevator car does not have to mean a certain elevator car or a plurality of elevator cars; for example, in the situation where an elevator calling operation changes, the correct elevator car is likely to correspondingly change as well. The "movement of entering a correct elevator car" refers to the movement of a passenger approximately constantly approaching the correct elevator car from an elevator landing area and stepping into the correct elevator car, including the movement process of approaching towards the correct elevator car, and also including the movement process of stepping into the correct elevator car.

In the present specification, a first wireless signal is defined with respect to a first wireless signal broadcast component mounted in an elevator car, and wireless signals broadcast by different first wireless signal broadcast components are all referred to as "first wireless signals"; and it will be understood that a plurality of first wireless signal broadcast components in a plurality of elevator cars can broadcast a plurality of first wireless signals, and the plurality of first wireless signals can be recognized in a distinguishing manner. A second wireless signal is defined with respect to a second wireless signal broadcast component mounted in an elevator landing area, and wireless signals broadcast by different second wireless signal broadcast components are all referred to as "second wireless signals"; and it will be understood that second wireless signal broadcast components in different elevator landing areas can broadcast different second wireless signals.

Figure 1:
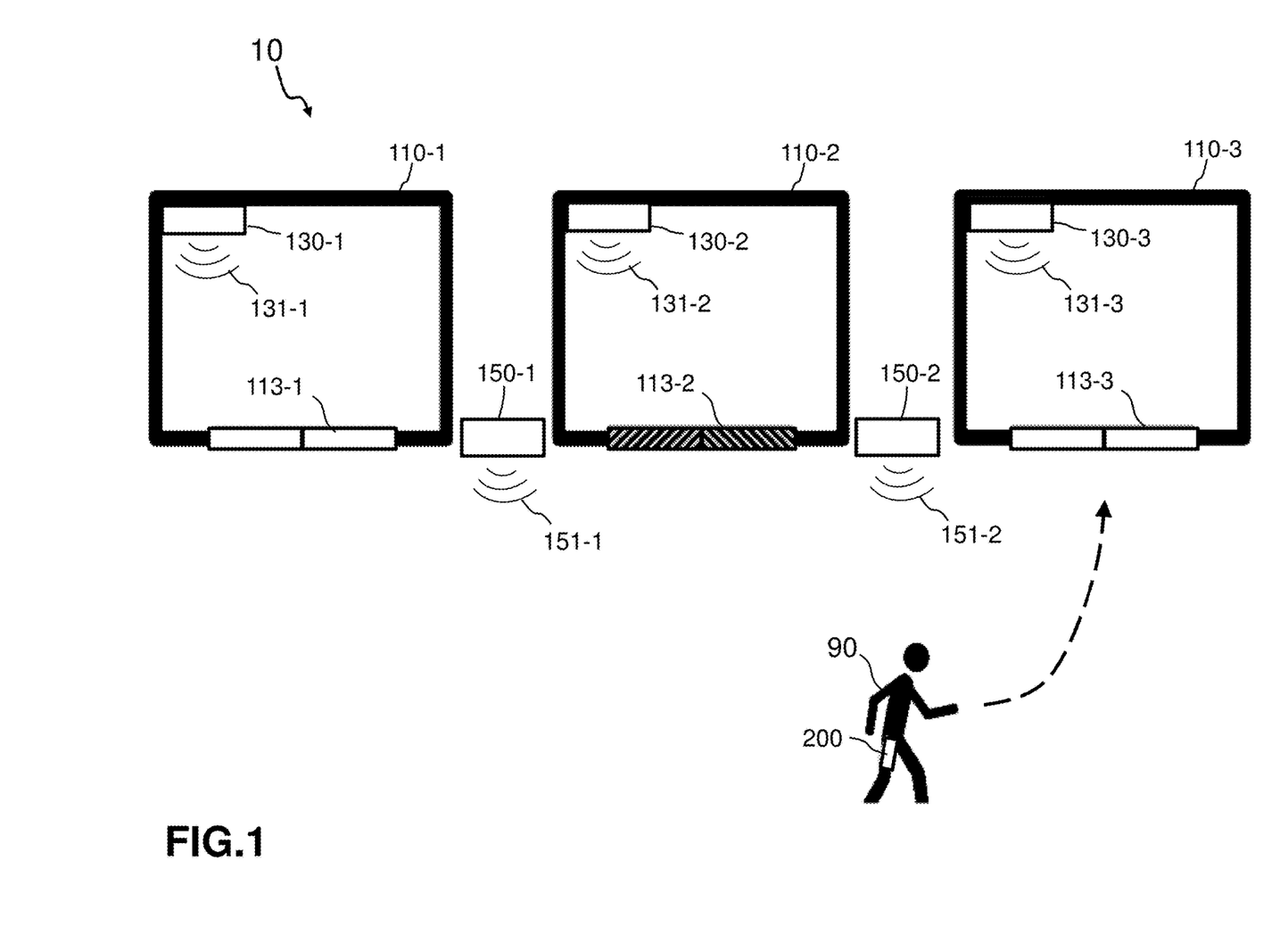
FIG. 1 shows a structural schematic diagram of an apparatus for guiding a passenger to enter a correct elevator car according to one embodiment of the present invention.

FIG. 1 shows a structural schematic diagram of an apparatus for guiding a passenger to enter a correct elevator car according to one embodiment of the present invention. It should be firstly noted that the guidance apparatus 10 according to the embodiment shown in FIG. 1 is mounted in an elevator system according to one embodiment of the present invention, and a plurality of elevator cars 110 are used for delivering passengers in the elevator system of this embodiment, for example, 3 elevator cars 110-1, 110-2 and 110-3 shown in FIG. 1 are used for delivering passengers; and it should be understood that the number of elevator cars 110 is not limited to 3, and a plurality of elevator cars 110 may travel upwards and downwards in different hoistways.

As shown in FIG. 1, the guidance apparatus 10 primarily comprises a first wireless signal broadcast component 130 mounted in a plurality of elevator cars 110 and can be partially realized by means of a personal mobile terminal 200 carried by a passenger 90 shown in FIG. 1. Each first wireless signal broadcast component 130 is mounted in each elevator car 110; for example, the elevator car 110-1 is provided with a first wireless signal broadcast component 130-1, the elevator car 110-2 is provided with a first wireless signal broadcast component 130-2, and the elevator car 110-3 is provided with a first wireless signal broadcast component 130-3. In one embodiment, the first wireless signal broadcast component 130 in each elevator car 110 can be, but is not limited to, mounted on a target floor registration control panel in the elevator car 110 and is arranged on the target floor registration control panel by way of integration, so as to be able to establish a communication connection (not shown in the drawing) with the elevator controller of the elevator system; and it would be understood that the particular integration and arrangement manner of the first wireless signal broadcast component 130 with respect to the target floor registration control panel is not restrictive.

The first wireless signal broadcast component 130 in each elevator car 110 can for example continuously broadcast a first wireless signal 131 through an antenna or a beacon provided thereon, or can broadcast the first wireless signal 131 when a car door 113 is open; as an example, the first wireless signal broadcast component 130-1 broadcasts a first wireless signal 131-1, the first wireless signal broadcast component 130-2 broadcasts a first wireless signal 131-2, and the first wireless signal broadcast component 130-3 broadcasts a first wireless signal 131-3; the first wireless signals 131-1, 131-2 and 131-3 broadcast thereby can be in the same signal form, and can also substantially have the same signal strength, but can be recognized in a distinguishing manner. The signal strength of the first wireless signal 131 can approximately decrease or attenuate with the increase of a broadcast distance thereof; therefore, a terminal receiving the first wireless signal 131 can approximately determine, according to the signal strength of the received first wireless signal 131, a distance of same relative to the first wireless signal broadcast component 130 broadcasting the first wireless signal 131, and thus can approximately determine the change in the distance according to the change in the signal strength. The decreasing mode of the first wireless signal 131 is not restrictive, but it can be determined in advance.

In one embodiment, the first wireless signal broadcast component 130 can be a bluetooth module and can particularly be a Bluetooth Low Energy (BLE) module, and correspondingly, the first wireless signal 131 transmitted or broadcast by the first wireless signal broadcast component 130 is a bluetooth low energy signal. In this way, the communication and interaction with a personal mobile terminal 200 which is realized by for example a smart cell phone, a wearable smart device and a personal digital assistant (PDA) is easy, and the energy consumption is low.

In a further embodiment, the first wireless signal broadcast component 130 can be a Wifi module, and the first wireless signal 131 broadcast thereby is a Wifi wireless signal.

When the elevator car 110 stops at a certain landing, in the case where the car door 113 of the elevator car 110 is open, the first wireless signal 131 can be broadcast to an elevator landing area corresponding to the landing, and a broadcast distance thereof can be determined in advance according to particular requirements.

The first wireless signal 131 is a recognizable wireless signal, for example it comprises identity (ID) information corresponding to the elevator car 110 mounted with the first wireless signal broadcast component 131, and the personal mobile terminal 200 receiving the first wireless signal 131 can determine, according to the ID information, which one of a plurality of elevator cars 110 the first wireless signal 131 is broadcast from. For example, the first wireless signals 131-1, 131-2 and 131-3 respectively broadcast from three different elevator cars 110-1, 110-2 and 110-3 contain different ID information, so that the personal mobile terminal 200 can recognize the currently received first wireless signal 131.

Again, as shown in FIG. 1, the guidance apparatus 10 can comprise a plurality of personal mobile terminals 200 respectively carried by each passenger 90 or can at least partially operate in the personal mobile terminal 200 of the passenger 90. FIG. 1 shows the personal mobile terminal 200 carried by one passenger 90, for example, it is placed in a pocket of the passenger 90; however, it should be understood that the number of passengers 90 carrying a personal mobile terminal 200 is not restrictive, and the way of the passenger 90 carrying the personal mobile terminal 200 is not restrictive either.

In one embodiment, the passenger can manually or automatically complete an elevator calling operation through the personal mobile terminal 200, and the particular way of automatically completing the elevator calling operation will be explained below by way of example. At the same time, the personal mobile terminal 200 will be able to receive a certain elevator car 110 designated for the passenger 90, i.e., a correct elevator car, and store same in the personal mobile terminal 200.

The personal mobile terminal 200 of the passenger 90 located in the elevator landing area will be able to receive the first wireless signal 131 broadcast from the elevator car 110 and recognize the first wireless signal 131. In one embodiment, if a plurality of elevator cars 110 stop at the same landing and open the car door 113, the personal mobile terminal 200 may be able to sense the first wireless signals 131 broadcast from the plurality of elevator cars 110; and the personal mobile terminal 200 can be configured to choose to receive the first wireless signal 131 with a higher signal strength; at this moment, it also indicates that the personal mobile terminal 200 is closest to the elevator car 110 from which the stronger first wireless signal 131 is broadcast.

In one embodiment, each personal mobile terminal 200 is used for receiving and recognizing the first wireless signal 131 broadcast by the first wireless signal broadcast component 130 of at least one of the plurality of elevator cars 110 and for determining the signal strength of the received first wireless signal 131. In particular, when the first wireless signal 131 is a bluetooth low energy signal, the personal mobile terminal 200 can particularly be a smart terminal configured with a bluetooth communication module such as a smart cell phone, a wearable smart device (e.g., a smart wristband), a personal digital assistant (PDA); and the bluetooth communication module chooses to receive a bluetooth low energy signal with a higher signal strength, and recognizes the bluetooth low energy signal by recognizing the ID information therein, namely, determining which elevator car 110 the bluetooth low energy signal is broadcast from; and the personal mobile terminal 200 can also be particularly configured with a received signal strength indicator (RSSI) for determining the signal strength of the bluetooth low energy signal or any other bluetooth signals received thereby.

In one embodiment, each personal mobile terminal 200 can analyze the change in the strength of the received current first wireless signal 131, for example, approximately gradually stronger or approximately gradually weaker; and the personal mobile terminal 200 is also configured to determine, based on the change in the signal strength of the received first wireless signal 131, the movement of the passenger 90 relative one of a plurality of elevator cars 110, that is, determining the movement relative to the elevator car 110 broadcasting the first wireless signal 131, and thus judge, based on a recognition result of the ID information mentioned above, whether the movement is a movement corresponding to entering the correct elevator car.

By taking the scenario shown in FIG. 1 as an example, when the three elevator cars 110-1, 110-2 and 110-3 stop at the landing where the passenger 90 is located, assuming that the car doors 113-1 and 113-3 of the elevator cars 110-1 and 110-3 are respectively open, and the car door 113-2 of the elevator car 110-2 is closed, the passenger 90 can sense the first wireless signals 131-1 and 131-3; since the position where the passenger 90 is currently located in the elevator landing area is closer to the elevator car 110-3, the strength of the sensed first wireless signal 131-3 is higher; and the personal mobile terminal 200 carried by the passenger 90 will choose to receive the first wireless signal 131-3 and recognize the first wireless signal 131-3, and determine the signal strength of the received first wireless signal 131-3.

Assuming that the passenger 90 moves towards the elevator car 110-3 according to the direction of the dashed line shown in FIG. 1, the personal mobile terminal 200 will be able to determine that the received first wireless signal 131-3 gradually becomes stronger, thereby determining that the current movement of the passenger 90 is approaching the elevator car 131-3.

If the elevator car 131-3 happens to be the designated elevator car, that is, corresponding to the correct elevator car of the passenger 90, the personal mobile terminal 200 can determine the elevator car corresponding to the movement based on the ID information recognized thereby, for example, determining that the approaching movement is an approaching movement corresponding to the elevator car 131-3, i.e., correspondingly being a movement of approaching the correct elevator car, and therefore it can be determined that the movement is a movement corresponding to entering the correct elevator car.

If the elevator car 131-1 is the designated elevator car (the elevator car 131-3 is an incorrect elevator car), the personal mobile terminal 200 can determine the elevator car corresponding to the movement based on the ID information recognized thereby, for example, determining that the approaching movement is an approaching movement corresponding to the elevator car 131-1, i.e., correspondingly being a movement of going away from the correct elevator car, and therefore it can be determined that the movement is not a movement corresponding to entering the correct elevator car.

The personal mobile terminal 200 can send out different guidance signals based on the above judgement result, and a guidance signal in a non-visual form is sent out in this embodiment; in this way, the passenger 90 can be guided to enter the correct elevator car without watching the personal mobile terminal, achieving the hand-free effect, greatly facilitating the passenger and improving passenger experience. In one embodiment, the guidance signal can be a vibration signal, and can also be a voice prompt signal, or can be a combination of both.

In one embodiment, when it is determined that the current movement of the passenger 90 is a movement corresponding to entering the correct elevator car, the passenger 90 may be able to determine which elevator car 110 is the correct elevator car, and the personal mobile terminal 200 may not send any guidance signal. When it is determined that the current movement of the passenger 90 is not a movement corresponding to entering the correct elevator car, the personal mobile terminal 200 will enhance the vibration signal and/or send out a voice prompt signal, and the passenger 90 will change the current movement when perceiving the vibration signal and/or hearing the voice prompt signal. Exemplarily, the passenger 90 changes to move towards the elevator car 131-1 (in the case where the elevator car 131-1 is the correct elevator car), that is to say, the passenger firstly moves away from the elevator car 131-3, and the vibration signal of the personal mobile terminal 200 will gradually become weaker; subsequently, the personal mobile terminal 200 of the passenger 90 will receive the first wireless signal 131-1, until the passenger enters the elevator car 131-1; the movement of approaching the elevator car 131-1 is detected and is determined to be a movement corresponding to entering the correct elevator car, and the personal mobile terminal 200 will not send out any vibration signal to stop the current movement of the passenger 90; as such, the passenger 90 will be guided to enter the correct elevator car.

Again, as shown in FIG. 1, in one embodiment, the guidance apparatus 10 further comprises a second wireless signal broadcast component 150 mounted in an elevator landing area, for sending information about the corresponding correct elevator car to the personal mobile terminal 200.

In one embodiment, the second wireless signal broadcast component 150 also serves as a constituent component of the elevator system, for realizing an automatic elevator calling operation function. In each elevator landing area, one or more second wireless signal broadcast components 150 can be mounted, for example, two, i.e., second wireless signal broadcast components 150-1 and 150-2. The second wireless signal broadcast components 150 can continuously transmit or broadcast a second wireless signal 151, for example, the second wireless signals 151-1 and 151-2 respectively broadcast by the second wireless signal broadcast components 150-1 and 150-2; when approaching the second wireless signal broadcast components 150, or once entering an elevator landing area 410, the personal mobile terminal 200 will be able to automatically establish a wireless communication connection with one second wireless signal broadcast component 150 thereof, and therefore the personal mobile terminal 200 automatically sends an elevator calling request command to the second wireless signal broadcast component 150, and the second wireless signal broadcast component 150 receives the elevator calling request command. In one example, the distance from the personal mobile terminal 200 to the second wireless signal broadcast component 150 is determined according to the signal strength of the second wireless signal received by the personal mobile terminal 200; and when the distance is smaller than or equal to a pre-determined distance threshold, the personal mobile terminal 200 automatically establishes a wireless communication connection with the second wireless signal broadcast component 150.

The elevator calling request command can be an elevator calling request command comprising an elevator calling direction and a target floor, and the second wireless signal broadcast component 150 can establish a connection with the elevator controller of the elevator system, and automatically send the elevator calling request command to the elevator controller. The elevator controller is used for controlling the running of a plurality of elevator cars 110 in the elevator system, for example, performing scheduling control based on the elevator calling request command; one of the plurality of elevator cars 110 is designated to stop at the landing where the passenger 90 is located and deliver the passenger to the corresponding target floor; and the designated elevator car 110 also registers the target floor of the passenger 90 in advance, for example, automatically registering the target floor on a floor registration control panel. As such, the passenger 90 can completely realize the automatic elevator calling operation and can realize the completion of the elevator calling operation in a hand-free manner.

The second wireless signal broadcast by the second wireless signal broadcast component 150 can comprise information about the designated elevator car received thereby from the elevator controller, and the personal mobile terminal 200 can receive and temporarily store the information about the designated elevator car. In the personal mobile terminal 200, the information about the designated elevator car will be compared with the elevator car 110 corresponding to the recognized first wireless signal 131, so as to judge whether the current movement of the passenger 90 is a movement corresponding to the correct elevator car.

After the passenger 90 enters the correct elevator car or reaches the target floor, the personal mobile terminal 200 can delete the above-mentioned temporarily stored information about the designated elevator car.

When combined and applied to the elevator system for completing an elevator calling operation in a hand-free manner according to the above-mentioned embodiment, the guidance apparatus 10 according to one embodiment of the present invention can realize the completely hand-free operation of the passenger 90 from starting to call an elevator to reaching the target floor; there is no need to take out the personal mobile terminal 200 from for example a pocket to watch, and it is not easy to take a wrong elevator, greatly improving the experience of the passenger while facilitating in ensuring the operation efficiency of the elevator system.

Furthermore, it needs to be noted that the guidance apparatus 10 is not limited to being applied to the elevator system for completing an elevator calling operation in a hand-free manner according to the above-mentioned embodiments, and the correct elevator car is also not limited to the designated elevator car. In other application scenarios, exemplarily, if the elevator car 110-1 shown in FIG. 1 is running between the 1st and the Nth landing, and the elevator car 110-3 does not stop at the 2nd to the Nth floor, assuming that the target floor of the passenger 90 is the (N+1)th floor, then the elevator car 110-1 will be set to be an incorrect elevator car at the personal mobile terminal 200 of the passenger 90, and the elevator car 110-3 will be set to the correct elevator car at the personal mobile terminal 200 of the passenger 90; when the passenger 90 approaches the elevator car 110-1 at the 1st floor, the personal mobile terminal 200 will send out or enhance a vibration signal, to prompt the passenger 90 that he/she is not walking into the correct elevator car at present.

Figure 2:
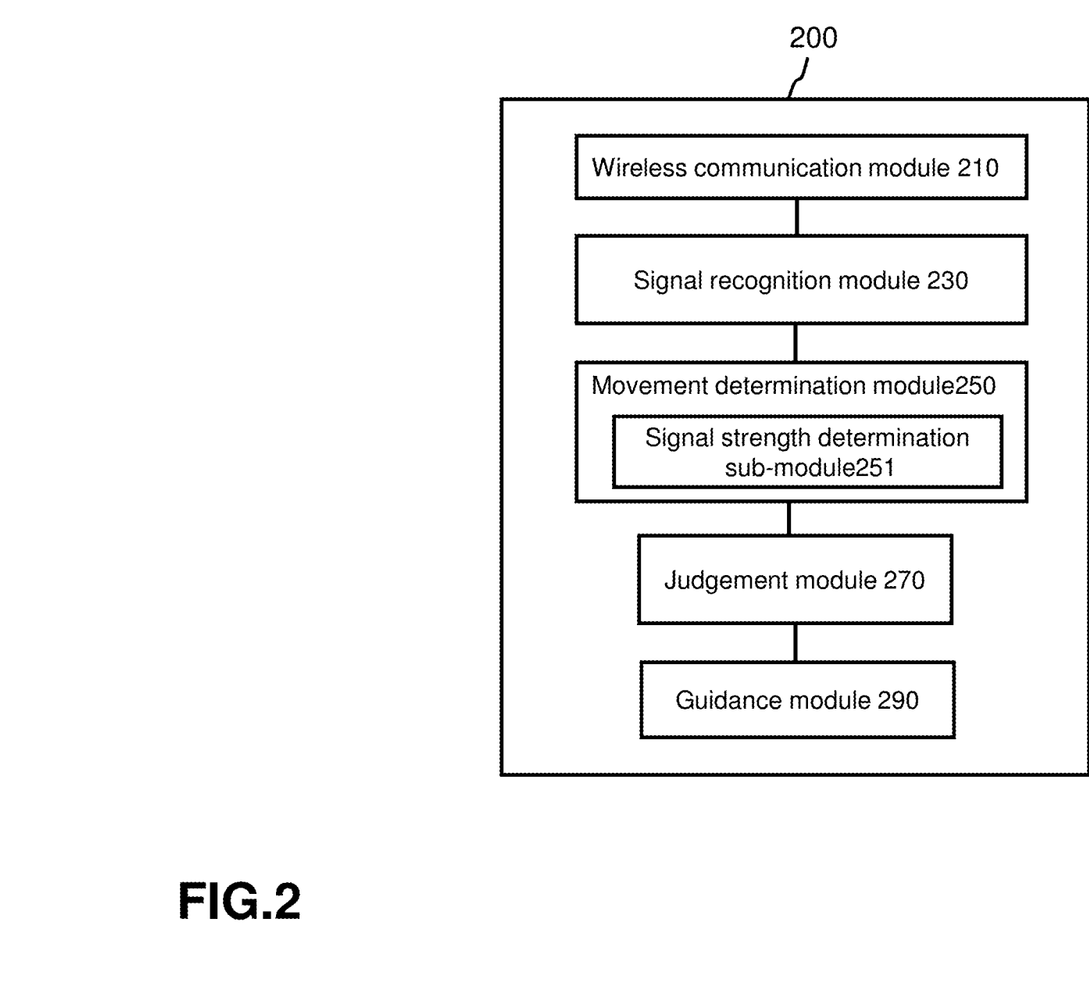
FIG. 2 illustrates a schematic diagram of a module structure of the apparatus according to the embodiment shown in FIG. 1 when at least partially realized via a personal mobile terminal.

FIG. 2 illustrates a schematic diagram of a module structure of the apparatus according to the embodiment shown in FIG. 1 when at least partially realized via a personal mobile terminal. The personal mobile terminal 200 according to one embodiment of the present invention is used for partially realizing the guidance apparatus 10 as shown in FIG. 1, wherein the personal mobile terminal 200 can comprise a wireless communication module 210, a signal recognition module 230, a movement determination module 250, a judgement module 270 and a guidance module 290.

In one embodiment, the wireless communication module 210 is used for at least receiving a recognizable first wireless signal 131, wherein the first wireless signal is broadcast from at least one of a plurality of elevator cars 110, and the signal strength of the first wireless signal 131 approximately decreases with the increase of a broadcast distance thereof. When the first wireless signal 131 is a bluetooth signal, the wireless communication module 210 can particularly be a bluetooth communication module. The wireless communication module 210 may be able to sense the first wireless signals 131 broadcast from the plurality of elevator cars 110; and the wireless communication module 210 can be configured to choose to receive the first wireless signal 131 with a higher signal strength; at this moment, it also indicates that the personal mobile terminal 200 is closest to the elevator car 110 from which the stronger first wireless signal 131 is broadcast.

In one embodiment, the signal recognition module 230 is used for recognizing the received first wireless signal 131, so as to determine which one of the plurality of elevator cars 110 the first wireless signal 131 is broadcast from, exemplarily, determining the elevator car 110 corresponding to the first wireless signal 131 by reading and recognizing the ID information in the received first wireless signal 131.

In one embodiment, the movement determination module 250 is used for determining the movement of the passenger 90 relative to one of the plurality of elevator cars 110 based on the change in the signal strength of the received first wireless signal 131. The movement determination module 250 can be provided with a signal strength determination sub-module 251 for determining the signal strength of the received first wireless signal 131 in real time, and the movement determination module 250 can for example be realized via an RSSI. The movement determination module 250 thus can continuously determine the signal strength of the first wireless signal 131 and learn the change in the signal strength of the first wireless signal 131, e.g., gradually becoming stronger or gradually becoming weaker. When the signal strength of the first wireless signal 131 gradually increases, the movement determination module 250 determines that the current movement of the passenger 90 is approaching an elevator car 110 corresponding to the first wireless signal 131, and when the signal strength of the first wireless signal 131 gradually decreases, the movement determination module 250 determines that the current movement of the passenger 90 is going away from the elevator car 110 corresponding to the first wireless signal 131. As such, the movement direction of the passenger 90 relative to the elevator car 110 corresponding to the first wireless signal 131 can be determined according to the change in the strength of the first wireless signal 131.

In one embodiment, the judgement module 270 is used for judging, based on a recognition result, whether the movement is a movement corresponding to entering the correct elevator car. In particular, if the elevator car corresponding to the recognized first wireless signal 131 is the correct elevator car stored in the personal mobile terminal 200, the movement is a movement corresponding to the correct elevator car, and if the movement is a movement of approaching the elevator car, the movement can be further determined to correspond to a movement of entering the correct elevator car.

In one embodiment, the guidance module 290 is used for, based on the judgement result of the judgement module 270, guiding the passenger 90 to enter the correct elevator car by means of the change in a vibration signal and/or a voice prompt signal. When it is determined that the current movement of the passenger 90 is a movement corresponding to entering the correct elevator car, the passenger 90 may be able to determine which elevator car 110 is the correct elevator car, and the personal mobile terminal 200 may not send any guidance signal. When it is determined that the current movement of the passenger 90 is not a movement corresponding to entering the correct elevator car, the guidance module 290 will enhance the vibration signal and/or send out a voice prompt signal, and the passenger 90 will change the current movement when perceiving the vibration signal and/or hearing the voice prompt signal. Exemplarily, as shown in FIG. 1, the passenger 90 changes to move towards the elevator car 131-1 (in the case where the elevator car 131-1 is the correct elevator car), that is to say, the passenger firstly moves away from the elevator car 131-3, and the vibration signal of the personal mobile terminal 200 will gradually become weaker; subsequently, the personal mobile terminal 200 of the passenger 90 will receive the first wireless signal 131-1, until the passenger enters the elevator car 131-1; the movement of approaching the elevator car 131-1 is detected and is determined to be a movement corresponding to entering the correct elevator car, and the personal mobile terminal 200 will not send out any vibration signal to stop the current movement of the passenger 90; as such, the passenger 90 will be guided to enter the correct elevator car.

Figure 3:
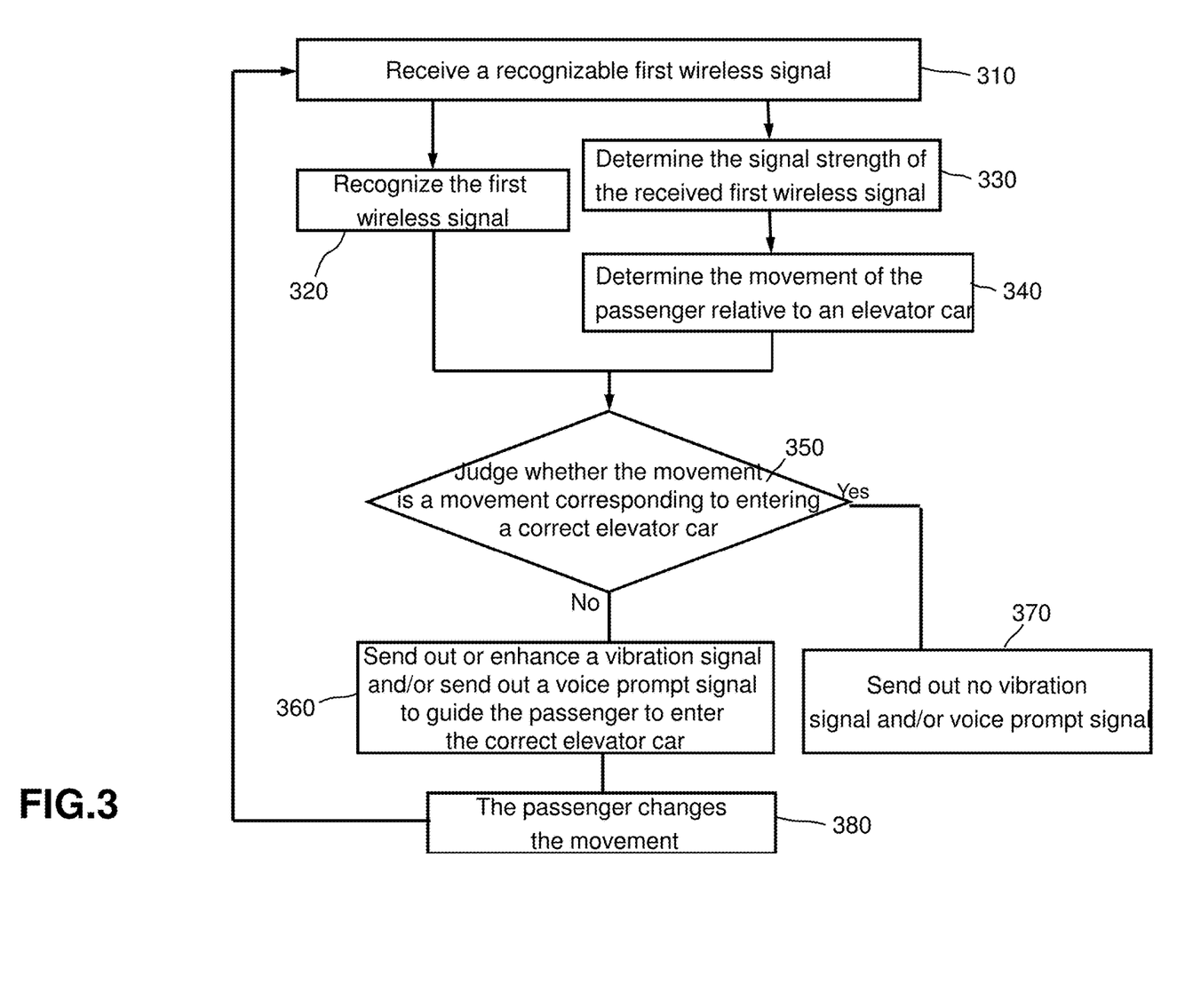
FIG. 3 is a flow chart of a method for guiding a passenger to enter a correct elevator car according to one embodiment of the present invention.

FIG. 3 shows a flow chart of a method for guiding a passenger to enter a correct elevator car according to one embodiment of the present invention. The guidance method according to the embodiment shown in FIG. 3 can be performed and completed in the personal mobile terminal 200, and the guidance method according to the embodiments of the present invention is explained in conjunction with FIG. 1 to FIG. 3.

Firstly, in step S310, a recognizable first wireless signal is received. In one embodiment, when a passenger 90 carrying a personal mobile terminal 200 is waiting for an elevator in an elevator landing area, when a car door 113 of any one of elevator cars 110 is open, a wireless communication module 210 will be able to sense a first wireless signal 131 broadcast from the elevator car 110, and further choose to receive a first wireless signal with highest signal strength, namely, establishing a connection with the first wireless signal broadcast component 130 corresponding to the first wireless signal 131.

The received first wireless signal can be recognized, i.e., step S320, and the step can be completed in a signal recognition module 230 of the personal mobile terminal 200.

Moreover, the determination of the signal strength of the received first wireless signal 131 is completed, i.e., step S330, and the step can be completed in a signal strength determination sub-module 251 of the personal mobile terminal 200.

Further, in step S340, the movement of the passenger 90 relative to one of a plurality of elevator cars 110 is determined based on the change in the signal strength of the received first wireless signal 131, that is, determining the current movement of the passenger 90 relative to the elevator car 110 corresponding to the first wireless signal 131; for example, when the signal strength of the received first wireless signal 131 continuously increases, determining the current movement of the passenger 90 to be approaching the elevator car 110 corresponding to the first wireless signal 131, otherwise, going away from the elevator car 110. Step S340 can be completed in a movement determination module 250 of the personal mobile terminal 200.

Further, in step S350, whether the movement determined in step S340 is a movement corresponding to entering the correct elevator car is judged based on the recognition result in step S320. In particular, by means of the elevator car corresponding to the recognition result, that is, the elevator car corresponding to the movement determined in step S340, the elevator car corresponding to the recognition result is compared with the temporarily stored correct elevator car, and if they are the same, the movement is a movement corresponding to the correct elevator car; further, if the movement is approaching the elevator car, the movement is a movement corresponding to entering the correct elevator car; otherwise, it is determined that the movement is not a movement corresponding to entering the correct elevator car. Step S350 can be completed in a judgement module 270 of the personal mobile terminal 200.

If a judgement result in step S350 is "yes", step S370 is entered, to send out no vibration signal and/or voice prompt signal, that is, not stopping the current movement of the passenger 90 via a guidance signal. In other embodiments, it is without doubt that a voice prompt signal for prompting the passenger that he/she is moving into the correct elevator car can also be sent out, or the vibration signal can be weakened to prompt the passenger that that he/she is getting closer and closer to the correct elevator car.

If a judgement result in step S350 is "no", step S360 is entered, to send out or enhance the vibration signal and/or send out a voice prompt signal, wherein the signal is used for guiding the passenger to enter the correct elevator car. Particularly, under the prompt of the strong vibration signal and/or voice prompt signal for the passenger 90, the passenger 90 is likely to change the movement, i.e., step S380; and further, steps S310 to S350 are returned to and performed, until the passenger 90 changes to move towards the correct elevator car and the judgement result in step S350 is "yes".

The above-mentioned steps S360 and S370 can be completed in a guidance module 290 of the personal mobile terminal 200.

Step S310 to step S370 can all be completed in the state where the screen of the personal mobile terminal 200 is turned off, and the passenger 90 does not need to watch or operate the personal mobile terminal 200.

Figure 4:
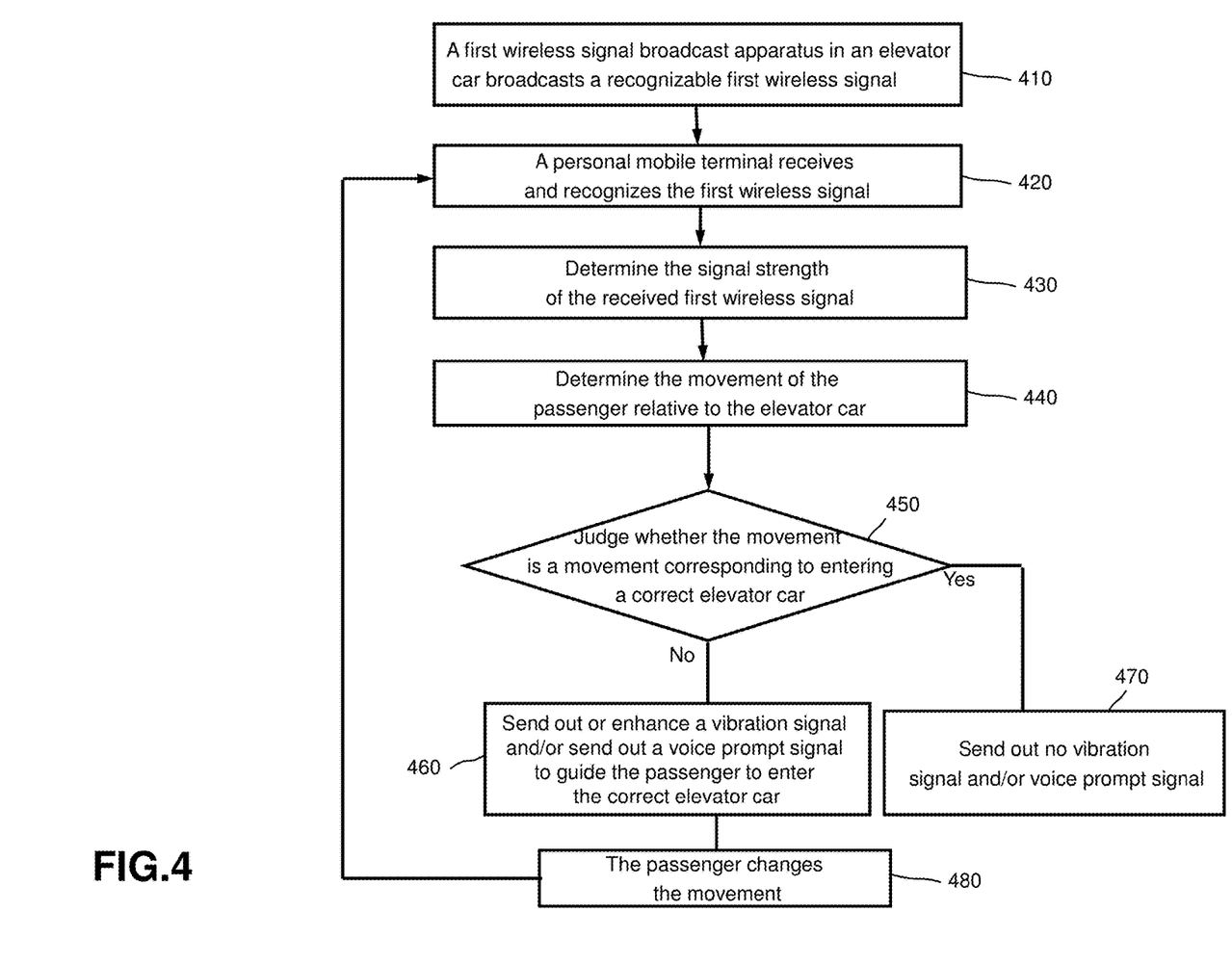
FIG. 4 is a flow chart of a method for guiding a passenger to enter a correct elevator car according to a further embodiment of the present invention.

FIG. 4 shows a flow chart of a method for guiding a passenger to enter a correct elevator car according to a further embodiment of the present invention. The guidance method according to the embodiment shown in FIG. 4 can be performed and completed in the guidance apparatus 10, and the guidance method according to the embodiments of the present invention is explained in conjunction with FIG. 1 to FIG. 4.

Firstly, in step S410, the first wireless signal broadcast component 130 in the elevator car 110 broadcasts a recognizable first wireless signal 131. The first wireless signal broadcast component 130 can continuously broadcast a first wireless signal 131 and can also broadcast the first wireless signal 131 only when the car door 113 of the elevator car 110 is open. When the car door 113 is open, the first wireless signal 131 can be broadcast to an elevator landing area outside the elevator car 110, and thus can be received and recognized by the personal mobile terminal 200 of the passenger 90 in the elevator landing area, i.e., step S420.

Further, in step S430, the personal mobile terminal 200 determines the signal strength of the received first wireless signal 131.

Further, in step S440, the movement of the passenger 90 relative to one of a plurality of elevator cars 110 is determined based on the change in the signal strength of the received first wireless signal 131, that is, determining the current movement of the passenger 90 relative to the elevator car 110 corresponding to the first wireless signal 131.

Further, in step S450, whether the movement determined in step S440 is a movement corresponding to entering the correct elevator car is judged based on the recognition result in step S420. In particular, by means of the elevator car corresponding to the recognition result, that is, the elevator car corresponding to the movement determined in step S440, the elevator car corresponding to the recognition result is compared with the temporarily stored correct elevator car, and if they are the same, the movement is a movement corresponding to the correct elevator car; further, if the movement is approaching the elevator car, the movement is a movement corresponding to entering the correct elevator car; otherwise, it is determined that the movement is not a movement corresponding to entering the correct elevator car.

If a judgement result in step S450 is "yes", step S470 is entered, to send out no vibration signal and/or voice prompt signal, that is, not stopping the current movement of the passenger 90 via a guidance signal. In other embodiments, it is without doubt that a voice prompt signal for prompting the passenger to enter the correct elevator car can also be sent out, or the vibration signal can be weakened to prompt the passenger that the correct elevator car is closer and closer.

If a judgement result in step S450 is "no", step S460 is entered, to send out or enhance the vibration signal and/or send out a voice prompt signal, wherein the signal is used for guiding the passenger to enter the correct elevator car. Particularly, under the prompt of the strong vibration signal and/or voice prompt signal for the passenger 90, the passenger 90 is likely to change the movement, i.e., step S480; and further, steps S410 to S450 are returned to and performed, until the passenger 90 changes to move towards the correct elevator car and the judgement result in step S450 is "yes".

Therefore, by means of the guidance method according to the embodiments shown in FIG. 3 and FIG. 4 above, the passenger 90 can be conveniently guided to enter the correct elevator car, and the passenger can be prevented from entering an incorrect elevator car, improving the operation efficiency of the elevator system.

A person skilled in the art will understand that the aspects of the present invention can be embodied as a system, a method or a computer program product. Therefore, the aspects of the present invention can be in the following forms: a full-hardware implementation, a full-software implementation (including firmware, resident software, microcodes, etc.), or an implementation combining a software and hardware aspect which generally can all be called "services", "circuits", "circuitry", "modules" and/or "processing systems". In addition, the aspects of the present invention can be realized in the form of a computer program product embodied in one or more computer readable mediums on which computer readable program codes are implemented.

Any combination of one or more computer readable mediums can be used. The computer readable mediums can be computer readable signal mediums or computer readable storage mediums. The computer readable storage mediums can be for example, but not limited to, electronic, magnetic, optical, electromagnetic, infrared or semi-conductor systems, devices or apparatuses, or any suitable combination of the above. More specific instances (a non-exhaustive list) of the computer readable storage mediums include the following: an electric connection with one or more electric wires, a portable computer disk, a hard disk, a random access memory (RAM), a read-only memory (ROM), an erasable programmable read-only memory (EPROM or flash memory), optical fiber, a portable compact disk read-only memory (CD-ROM), an optical storage apparatus, a magnetic storage apparatus, or any suitable combination of the above. In the context of the document, the computer readable storage medium can be any tangible medium that can contain or store instructions to be used by the instruction execution system, device or apparatus or combined therewith.

The program codes and/or executable instructions embodied on the computer readable medium can be transmitted with any appropriate medium, which includes, but is not limited to, wireless, wired, fiber-optic cables, RF, etc., or any appropriate combination of the above.

The computer program codes for implementing operations of the aspects of the present invention can be written with any combination of one or more programming languages, including object-oriented programming languages such as Java, Smalltalk and C++, and traditional programming languages such as "C" programming language or similar programming languages. The program codes can be completely executed on a user's computer (apparatus), partially executed on a user's computer, executed as an independent software package, partially executed on a user's computer and partially executed on a remote computer, or completely executed on a remote computer or a server. In the later situation, the remote computer can be connected to the user's computer through any type of network including a local area network (LAN) or a wide area network (WAN) or can be connected to an external computer (for example, connecting through the Internet using an Internet service provider).

The computer program instructions can be provided to a processor of a general-purpose computer, a processor of a special-purpose computer such as an image processor or other programmable data processing devices to construct a machine, so that an approach for implementing a function/action specified in one or more blocks of the flowchart and/or block diagram is created via the instructions executed by the processor of the computer or other programmable data processing devices.

The computer program instructions can also be loaded onto a computer, other programmable data processing devices or other apparatuses, so as to execute a series of operation steps on the computer, other programmable data processing devices or other apparatuses, to generate a computer-implemented process, so that the instructions executed on the computer or other programmable devices provide a process for implementing the functions and actions specified herein.

It should also be noted that, in some alternative implementation manners, the functions/operations shown in the blocks may not happen in the sequence shown in the flowchart. For example, two blocks successively shown can be executed substantially at the same time in fact, or these blocks can be executed in a reversed order sometimes, depending on the involved function/operation in particular. Although a specific step sequence is shown, disclosed and claimed, it should be understood that the steps can be implemented in any order, separated or combined, and will still benefit from the present disclosure, unless otherwise specified.

The present specification discloses the present invention with instances, including best modes, and also enables any person skilled in the art to practice the present invention, including fabricating and using any apparatus or system and executing any covered method. The scope of patent protection of the present invention is defined by the claims, and can include other instances came up with by a person skilled in the art. If such other instances have structural elements not different from the literal meaning of the claims, or if they include equivalent structural elements not substantially different from the literal meaning of the claims, they are intended to be within the scope of the claims.

The invention claimed is:

1. An apparatus operable to perform apparatus operations comprising:
   receiving a recognizable first wireless signal broadcast from a first wireless signal broadcast component mounted in each of a plurality of elevator cars;
   recognizing the recognizable first wireless signal;
   determining a signal strength of the recognizable first wireless signal;
   determining a movement of a passenger relative to at least one of the plurality of elevator cars based on a change in the signal strength of the recognizable first wireless signal; and
   making a movement determination comprising determining, based on the change in the signal strength of the recognizable first wireless signal, whether the movement is toward entering a correct one of the plurality of elevator cars;
   wherein the correct one of the plurality of elevator cars comprises an elevator car that has been designated for the passenger.

2. The apparatus of claim 1, wherein:
the apparatus operations further comprise generating a corresponding vibration signal or a corresponding voice prompt signal based on the determination; and
the corresponding vibration signal or the corresponding voice prompt signal guides the passenger to enter the correct one of the plurality of elevator cars.

3. The apparatus of claim 2, wherein the apparatus operations further comprise enhancing the corresponding vibration signal or sending out the corresponding voice prompt signal when the movement is not toward entering the correct one of the plurality of elevator cars.

4. The apparatus of claim 1, wherein:
the first wireless signal comprises identity information corresponding to the elevator car mounted with the first wireless signal broadcast component; and
the apparatus operations further comprise:
recognizing the identity information of the recognizable first wireless signal; and
making the movement determination further comprises determining, based on the recognized identity information, whether the movement is toward the correct one of the plurality of elevator cars.

5. The apparatus of claim 1, wherein the apparatus operations further comprise temporarily storing in the apparatus the correct one of the plurality of elevator cars.

6. The apparatus of claim 1, wherein:
the first wireless signal broadcast component comprises a bluetooth lower energy module; and
the recognizable first wireless signal comprises a bluetooth lower energy signal.

7. The apparatus of claim 1, wherein the apparatus operations further comprise receiving from a second wireless signal broadcast component mounted in an elevator landing area information about the correct one the plurality of elevator cars.

8. The apparatus of claim 1, wherein the apparatus is incorporated within an elevator system comprising the plurality of elevator cars and an elevator controller.

9. The apparatus of claim 8, wherein:
the elevator system further comprises a second wireless signal broadcast component mounted in an elevator landing area: and
the second wireless signal broadcast component is configured to:
broadcast a second wireless signal;
automatically establish a wireless communication connection with the apparatus based on the second wireless signal; and
receive an elevator calling request command sent automatically from the apparatus when establishing the wireless communication connection.

10. The apparatus of claim 9, wherein the personal mobile terminal is further configured to:
approximately determine a distance from the apparatus to the second wireless signal broadcast component according to the signal strength of the second wireless signal; and
automatically establish the wireless communication connection when the distance is smaller than or equal to a pre-determined distance threshold.

11. The apparatus of claim 9, wherein:
the second wireless signal broadcast component is used for sending the elevator calling request command to the elevator controller;
the elevator controller is used for designating a corresponding elevator car for the passenger based on the elevator calling request command; and
the elevator system is used for sending, through the second wireless signal broadcast component, information about the designated elevator car to the apparatus.

12. A method for guiding a passenger to enter a correct elevator car, the method comprising:
receiving a recognizable first wireless signal broadcast from at least one of a plurality of elevator cars;
wherein a signal strength of the first wireless signal approximately decreases with an increase of a broadcast distance thereof;
recognizing the recognizable first wireless signal so as to determine which one of the plurality of elevator cars the first wireless signal is broadcast from;
determining a movement of the passenger relative to one of the plurality of elevator cars based on a change in the signal strength of the recognizable first wireless signal; and
judging, based on a result of the recognizing, whether the movement corresponds to a movement of the passenger toward entering the correct elevator car;
wherein the correct elevator car comprises an elevator car that has been designated for the passenger.

13. The method of claim 12 further comprising based on a result of the judging, guiding the passenger to enter the correct elevator car by means of a change in a vibration signal or change in a voice prompt signal.

14. The method of claim 13, wherein:
during guiding the passenger to enter the correct elevator car, when the movement corresponds to the movement of the passenger toward entering the correct elevator car, no vibration signal is sent out or the vibration signal is weakened; and
when the movement corresponds to the movement of the passenger toward not entering the correct elevator car, the vibration signal is enhanced or the voice prompt signal is sent out.

15. The method of claim 12, wherein:
the recognizable first wireless signal comprises identity information corresponding to the elevator car mounted with the first wireless signal broadcast component; and
the recognizing comprises recognizing the identity information in the recognizable first wireless signal.

16. The method of claim 15, the judging comprises comparing the identity information with identity information corresponding to the correct elevator car, and if the identity information and the identity information corresponding to the correct elevator car are the same, it is determined that the movement corresponds to a movement of the passenger toward entering the correct elevator car.

17. The method of claim 12 further comprising:
based on the change in the signal strength of the recognizable first wireless signal comprising an increase in the signal strength of the recognizable first wireless signal at a predetermined increase rate, determining that the movement of the passenger is approaching an elevator car corresponding to the recognizable first wireless signal; and
based on the change in the signal strength of the recognizable first wireless signal comprising a decrease in the signal strength of the recognizable first wireless signal at a predetermined decrease rate, determining that the movement of the passenger is going away from the elevator car corresponding to the recognizable first wireless signal.

18. The method as claimed in claim 12, wherein the recognizable first wireless signal comprises a bluetooth lower energy signal.

19. A computer readable storage medium with a computer program stored thereon, wherein the computer readable storage medium is a tangible medium that stores the computer program to be executed by a processor to implement the method of claim 12.

20. An apparatus operable to perform apparatus operations comprising:

receiving a recognizable first wireless signal broadcast from a first wireless signal broadcast component mounted in each of a plurality of elevator cars;

recognizing the recognizable first wireless signal;

determining a signal strength of the recognizable first wireless signal;

determining a movement of a passenger relative to at least one of the plurality of elevator cars based on a change in the signal strength of the recognizable first wireless signal; and     making a movement determination comprising determining, based on the change in the signal strength of the recognizable first wireless signal, whether the movement is toward entering a correct one of the plurality of elevator cars;

generating a corresponding vibration signal or a corresponding voice prompt signal based on the determination;

wherein the corresponding vibration signal or the corresponding voice prompt signal guides the passenger to enter the correct one of the plurality of elevator cars; and     enhancing the corresponding vibration signal or sending out the corresponding voice prompt signal when the movement is not toward entering the correct one of the plurality of elevator cars.

\* \* \* \* \*